United States Patent
Kim et al.

(10) Patent No.: US 10,840,537 B2
(45) Date of Patent: Nov. 17, 2020

(54) METHOD OF MANUFACTURING SECONDARY BATTERY AND SECONDARY BATTERY MANUFACTURED BY THE METHOD

(71) Applicant: Samsung SDI Co., Ltd., Yongin-si (KR)

(72) Inventors: Yuna Kim, Yongin-si (KR); Jangho Yoon, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 829 days.

(21) Appl. No.: 14/944,122

(22) Filed: Nov. 17, 2015

(65) Prior Publication Data

US 2016/0141709 A1    May 19, 2016

(30) Foreign Application Priority Data

Nov. 19, 2014  (KR) .......................... 10-2014-0161667

(51) Int. Cl.
*H01M 2/26*      (2006.01)
*H01M 10/04*     (2006.01)

(52) U.S. Cl.
CPC ......... *H01M 10/049* (2013.01); *H01M 2/266* (2013.01)

(58) Field of Classification Search
None
See application file for complete search history.

(56) References Cited

U.S. PATENT DOCUMENTS

| | | | | |
|---|---|---|---|---|
| 2014/0147716 A1* | 5/2014 | Oh | ................... | H01M 10/0587 |
| | | | | 429/94 |
| 2015/0147598 A1* | 5/2015 | Inoue | ..................... | H01M 2/26 |
| | | | | 429/7 |
| 2016/0175979 A1* | 6/2016 | Gwon | ................... | H01M 10/04 |
| | | | | 429/211 |

FOREIGN PATENT DOCUMENTS

| | | | |
|---|---|---|---|
| JP | 04088620 A | * | 3/1992 |
| JP | 2012-033449 A | | 2/2012 |
| JP | 2014-018810 A | | 2/2014 |
| KR | 10-2012-0088122 A | | 8/2012 |

* cited by examiner

*Primary Examiner* — Haixia Zhang
(74) *Attorney, Agent, or Firm* — Knobbe, Martens, Olson & Bear, LLP

(57) ABSTRACT

A method of manufacturing a secondary battery and a secondary battery manufactured by the method are disclosed. In one aspect, the method includes providing an electrode assembly including first and second electrode plates, wherein the first electrode plate includes a plurality of first multi-tabs outwardly extending from an end thereof, and wherein the second electrode plate includes a plurality of second multi-tabs outwardly extending from an end thereof. The method also includes tack welding the first and second multi-tabs with the use of upper and lower welding tools, wherein the upper welding tool has a protrusion and the lower welding tool has a recess, and wherein a bending portion is formed in the first and second multi-tabs. The method further includes and welding lead tabs to the tack welded first and second multi-tabs, respectively and accommodating the electrode assembly having the lead tabs welded thereto in a case.

15 Claims, 4 Drawing Sheets

METHOD OF MANUFACTURING SECONDARY BATTERY AND SECONDARY BATTERY MANUFACTURED BY THE METHOD

INCORPORATION BY REFERENCE TO ANY PRIORITY APPLICATIONS

This application claims priority from Korean Patent Application No. 10-2014-0161667 filed on Nov. 19, 2014 in the Korean Intellectual Property Office, and all the benefits accruing therefrom under 35 U.S.C. 119, the contents of which in its entirety are herein incorporated by reference.

BACKGROUND

Field

The described technology generally relates to a manufacturing method for a secondary battery and a secondary battery using the same.

Description of the Related Technology

In general, a secondary battery includes an electrode assembly accommodated in a can together with an electrolytic solution. The electrode assembly may include a positive plate, a negative plate, and a separator. The positive (or negative) plate may include a foil-shaped positive (or negative) electrode assembly and a positive (or negative) active material coated thereon. Here, a plurality of multi-tabs extending from an uncoated portion are formed in the electrode assembly of the positive (or negative) plate and lead tabs are generally welded to the multi-tabs to be connected to an external circuit.

SUMMARY OF CERTAIN INVENTIVE ASPECTS

One inventive aspect is a manufacturing method for a secondary battery and a secondary battery using the same, which can relieve vibrations and impacts applied to the secondary battery.

Another aspect is a manufacturing method for a secondary battery and a secondary battery using the same, which can be simplified by skipping an additional bending process of multi-tabs.

Another aspect is a manufacturing method for a secondary battery, the manufacturing method including preparing an electrode assembly, the electrode assembly including a first electrode plate having a plurality of first multi-tabs extending toward one end, a second electrode plate having a plurality of second multi-tabs extending toward one end and a separator interposed between the first electrode plate and the second electrode plate, multi-tab tack welding the first and second multi-tabs using a horn and an anvil, respectively, welding lead tabs to the tack welded first and second multi-tabs, respectively, and accommodating the electrode assembly having the lead tabs welded thereto in a case. In the multi-tab tack welding, the horn has a protrusion part protruding toward the anvil and the anvil has a recess part corresponding to the protrusion part, so that each of the first and second multi-tabs has a bending part.

In the multi-tab tack welding, the protrusion part and the recess part may be arch-shaped.

In addition, in the multi-tab tack welding, each of the first and second multi-tabs may include a first region extending lengthwise from the electrode assembly, a second region extending lengthwise from the first region and having a bending part, and a third region extending lengthwise from the second region.

Further, in the multi-tab tack welding, at least the first and second regions of the multi-tabs may be tack welded simultaneously.

In the lead tab welding, the lead tab may be welded to the third region.

After the accommodating in the case, the manufacturing method may further include sealing a top opening of the case with a cap plate.

Another aspect is a secondary battery including an electrode assembly including a first electrode plate having a plurality of first multi-tabs extending toward one end, a second electrode plate having a plurality of second multi-tabs extending toward one end and a separator interposed between the first electrode plate and the second electrode plate, a first lead tab welded to the first multi-tab and a second lead tab welded to the second multi-tab, a case accommodating the electrode assembly therein and having a top opening, a cap plate sealing the top opening of the case, and a first terminal and a second terminal passing through the cap plate and protruding to the outside, the first terminal electrically connected to the first lead tab and the second terminal electrically connected to the second lead tab. Here, the first and second multi-tabs are tack welded to each other to have a bending part.

The multi-tab tack welding may be performed by ultrasonic welding using a horn and an anvil.

The horn may have a protrusion part protruding to the anvil and the anvil may have a recess part corresponding to the protrusion part.

Each of the first and second multi-tabs may include a first region extending lengthwise from the electrode assembly, a second region extending lengthwise from the first region and having a bending part, and a third region extending lengthwise from the second region.

At least the first and second regions of the multi-tabs may be tack welded to simultaneously.

Another aspect is a method of manufacturing a secondary battery, the method comprising: providing an electrode assembly, the electrode assembly including first and second electrode plates, and a separator interposed between the first and second electrode plates, wherein the first electrode plate includes a plurality of first multi-tabs outwardly extending from an end thereof, and wherein the second electrode plate includes a plurality of second multi-tabs outwardly extending from an end thereof; tack welding the first and second multi-tabs with the use of upper and lower welding tools, wherein the upper welding tool has a protrusion and the lower welding tool has a recess, and wherein, after the tack welding, a bending portion is formed in each of the first and second multi-tabs. welding lead tabs to the tack welded first and second multi-tabs, respectively; and accommodating the electrode assembly having the lead tabs welded thereto in a case.

In the above method, each of the protrusion and the recess is substantially arch-shaped. In the above method, each of the first and second multi-tabs includes: a first region extending lengthwise from the electrode assembly; a second region extending lengthwise from the first region and having the bending portion; and a third region extending lengthwise from the second region. In the above method, at least the first and second regions of the multi-tabs are tack welded substantially simultaneously. In the above method, the lead tabs are welded to the third region. In the above method, after the tack welding, the thickness of the first region is substantially the same as that of the third region.

In the above method, each of the first and second multi-tabs further includes a fourth region formed between the first region and the first and second electrode plates, and wherein after the tack welding, the thickness of the fourth region is greater than that of the first and third regions. The above method further comprises sealing a top opening of the case with a cap plate subsequent to the accommodating. In the above method, the tack welding comprises: aligning the first and second multi-tabs; and placing the first and second multi-tabs between the upper and lower welding tools; and pressing the upper welding tool toward the lower welding tool such that at least part of the protrusion and the first and second multi-tabs are inserted into the recess. In the above method, the tack welding is performed by ultrasonic welding.

Another aspect is a secondary battery comprising: an electrode assembly including first and second electrode plates, and a separator interposed between the first and second electrode plates, wherein the first electrode plate includes a plurality of first multi-tabs outwardly extending from an end thereof, wherein the second electrode plate includes a plurality of second multi-tabs outwardly extending from an end thereof, and wherein each of the first and second multi-tabs has a bending portion being substantially arch-shaped; and a case accommodating the electrode assembly therein and having a top opening.

The above battery further comprises: a first lead tab welded to the first multi-tabs; a second lead tab welded to the second multi-tabs; a cap plate sealing the top opening of the case; and a first terminal and a second terminal passing through the cap plate, wherein the first and second terminals are respectively electrically connected to the first and second lead tabs. In the above battery, each of the first and second multi-tabs includes: a first region extending lengthwise from the electrode assembly; a second region extending lengthwise from the first region and having the bending portion; and a third region extending lengthwise from the second region. In the above battery, the thickness of the first region is substantially the same as that of the third region. In the above battery, each of the first and second multi-tabs further includes a fourth region formed between the first region and the first and second electrode plates, and wherein the thickness of the fourth region is greater than that of the first and third regions.

Another aspect is a method of manufacturing a secondary battery, the method comprising: providing an electrode assembly, the electrode assembly including first and second electrode plates, and a separator interposed between the first and second electrode plates, wherein the first electrode plate includes a plurality of first multi-tabs outwardly extending from an end thereof, and wherein the second electrode plate includes a plurality of second multi-tabs outwardly extending from an end thereof; tack welding the first and second multi-tabs so as to form a bending portion in each of the first and second multi-tabs has; and accommodating the electrode assembly having the lead tabs welded thereto in a case.

In the above method, the tack welding comprises: aligning the first and second multi-tabs; and placing the first and second multi-tabs between upper and lower welding tools, wherein the upper welding tool has a protrusion and the lower welding tool has a recess; and pressing the upper welding tool toward the lower welding tool such that at least part of the protrusion and the first and second multi-tabs are inserted into the recess. In the above method, each of the protrusion and the recess is substantially arch-shaped. The above method further comprises welding lead tabs to the tack welded first and second multi-tabs, respectively. In the above method, the tack welding is performed by ultrasonic welding.

At least one of the disclosed embodiments may provide relieved vibrations and impacts for a secondary battery.

In addition, the manufacturing method of the secondary battery can be simplified by skipping an additional bending process of multi-tabs.

DETAILED DESCRIPTION OF CERTAIN INVENTIVE EMBODIMENTS

Hereinafter, examples of embodiments will be described in detail with reference to the accompanying drawings such that they can easily be made and used by those skilled in the art.

As used herein, the term "and/or" includes any and all combinations of one or more of the associated listed items. In addition, the terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprises" and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Figure 1:
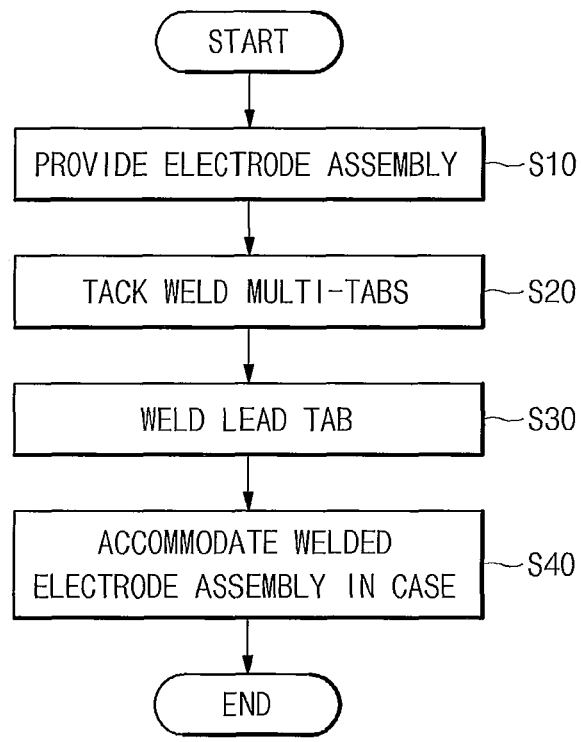
FIG. 1 is a flowchart illustrating a manufacturing method for a secondary battery according to an embodiment.

Referring to FIG. 1, the manufacturing method for a secondary battery according to an embodiment includes preparing an electrode assembly (S10), multi-tab tack welding (S20), lead tab welding (S30) and accommodating in a case (S40).

Figure 2:
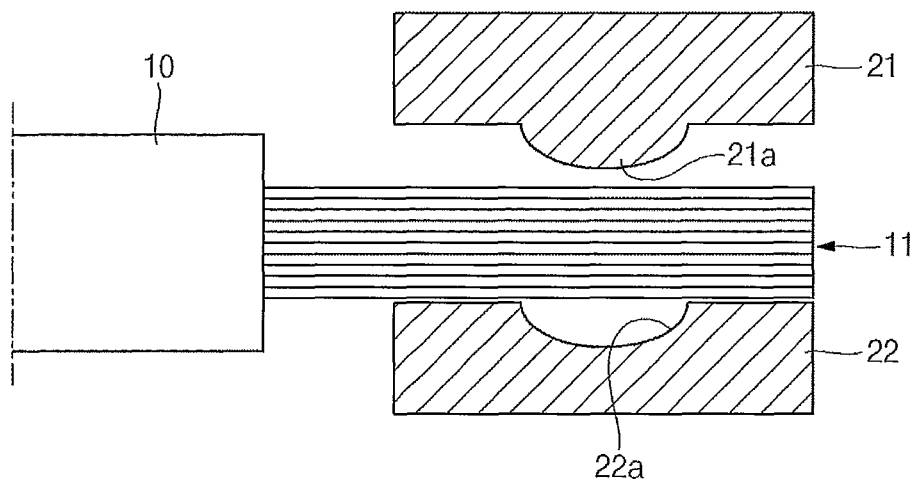
FIGS. 2 to 6 are partially cross-sectional views sequentially illustrating a manufacturing method for a secondary battery according to an embodiment.

Referring first to FIG. 2, in the preparing of the electrode assembly (S10), an electrode assembly 10 is prepared. The electrode assembly 10 may be formed by winding or laminating a stacked structure of a first electrode plate (not shown), a separator (not shown), and a second electrode plate (not shown), which are thin plates or layers. Here, the first electrode plate may function as a negative electrode and the second electrode plate may function as a positive electrode.

In an implementation, the first electrode plate includes a negative active material layer coated on opposite surfaces of a negative current collector formed of a conductive metal thin plate, for example, a copper (Cu) or nickel (Ni) foil. As a negative active material of the negative active material layer, a carbon (C) based material, Si, Sn, tin oxide, composite tin alloys, transition metal oxide, lithium metal nitride or lithium metal oxide may be used, but the described technology is not limited thereto. In addition, the first electrode plate may include a first electrode uncoated portion that is not coated with a negative active material layer.

The first electrode uncoated portion becomes a path of the flow of current between the first electrode plate and the outside of the first electrode plate. A plurality of first multi-tabs 11 extend from the first electrode uncoated portion toward one end.

In some embodiments, the first multi-tabs 11 extend from a base member of the first electrode plate to be integrally formed with the first electrode uncoated portion.

In addition, the second electrode plate includes a positive active material layer coated on opposite surfaces of a positive current collector formed of a highly conductive metal thin plate, for example, an aluminum (Al) foil. As a positive active material of the positive active material layer, a chalcogenide compound may be used, and examples thereof may include $LiCoO_2$, $LiMn_2O_4$, $LiNiO_2$, $LiNi_{1-x}Co_xO_2$ (where $0<x<1$), and $LiMnO_2$, but the described technology is not limited thereto. In addition, the second electrode plate may include a second electrode uncoated portion that is not coated with a positive active material layer.

The second electrode uncoated portion becomes a path of the flow of current between the second electrode plate and the outside of the second electrode plate. A plurality of second multi-tabs (not shown) extend from the second electrode uncoated portion toward one end.

In some embodiments, the second multi-tabs extend from a base member of the second electrode plate to be integrally formed with the second electrode uncoated portion.

The first electrode plate and the second electrode plate may be arranged in different polarities. That is to say, the first electrode plate may function as a positive electrode and the second electrode plate may function as a negative electrode.

The separator may prevent a short between the first electrode plate and the second electrode plate and allows only charges of the secondary battery, for example, lithium ions, to move. The separator may be made of polyethylene, polypropylene, or a copolymer of polyethylene and polypropylene, but the described technology is not limited thereto. The separator may be formed to have a width greater than the first electrode plate or the second electrode plate, which is advantageous for preventing an electrical short-circuit between the first and second electrode plates.

Figure 3:
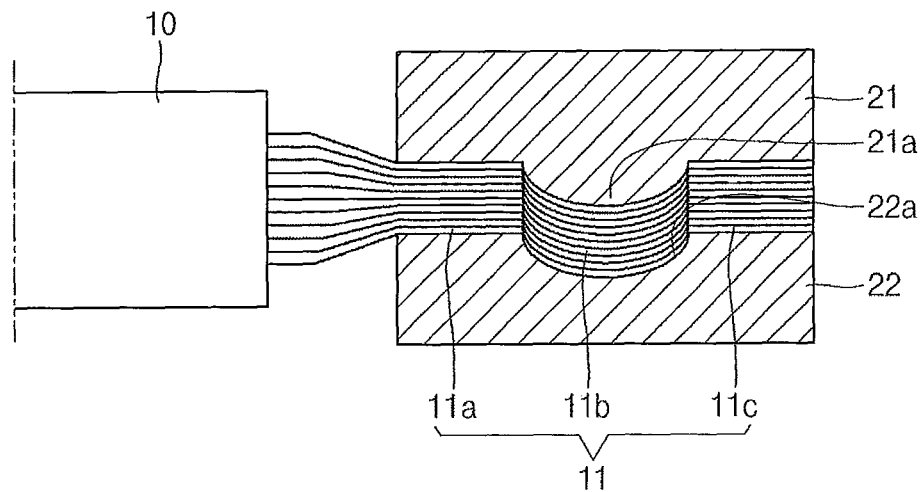
Figure 4:
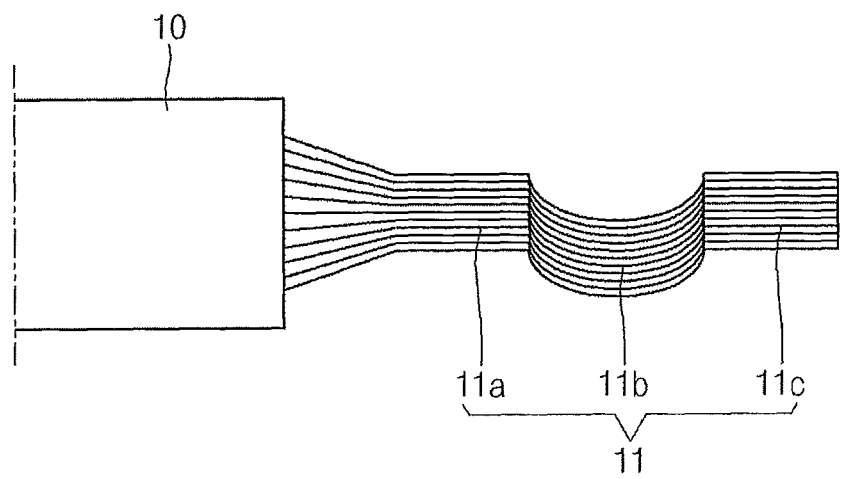

Referring to FIGS. 2 to 4, in the multi-tab tack welding (S20), tack welding is performed such that a plurality of first multi-tabs 11 and/or second multi-tabs 12 (sec FIG. 6) extending to one end of the electrode assembly 10 are mounted between a horn (sonotrode) or an upper welding tool 21 and an anvil (fixed shaped nest) or a lower welding tool 22, and the first multi-tabs 11 and/or second multi-tabs 12 are aligned while pressing the horn 21 on the anvil 22. Thereby, it is possible to prevent defects such as tab flying of later process. The tack welding can be performed by, for example, ultrasonic welding.

The horn 21 has a protrusion part 21a protruding toward the anvil 22 to a predetermined height and the anvil 22 has a recess part 22a corresponding to the protrusion part 21a and recessed to a predetermined depth. Here, the protrusion part 21a and the recess part 22a may be arch-shaped to minimize damage applied to the first multi-tabs 11 and/or the second multi-tabs 12. The protrusion part 21a and the recess part 22a can have other polygonal shapes.

Accordingly, a bending part 11b is formed in the first multi-tabs 11 at locations corresponding to the protrusion part 21a and the recess part 22a. In other words, the first multi-tabs 11 has a first region 11a extending lengthwise from the electrode assembly 10, a second region 11b extending lengthwise from the first region 11a and having a bending part, and a third region 11c extending lengthwise from the second region 11b.

In some embodiments, the second region 11b having the bending part is substantially arch-shaped, like the protrusion part 21a and the recess part 22a, thereby dampening external impacts and vibrations. The second region 11b can have other polygonal shapes corresponding to the protrusion part 21a and the recess part 22a having polygonal shapes. This applies to the FIG. 7 embodiment.

Figure 5:
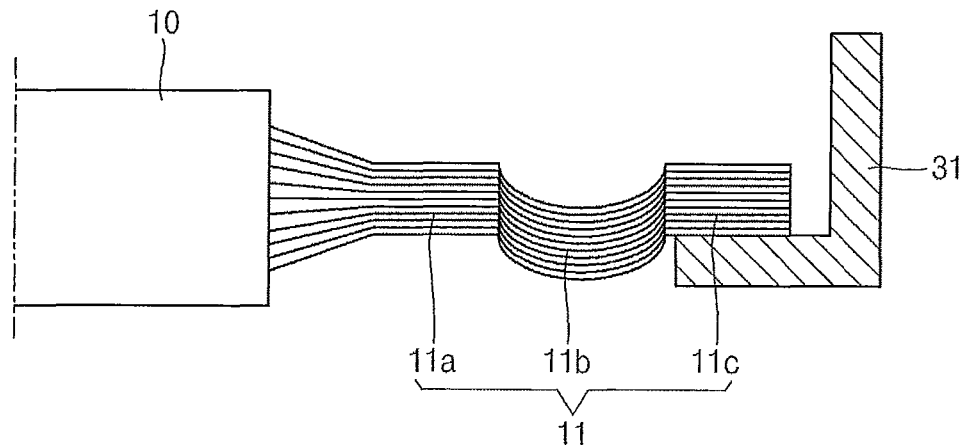

Next, referring to FIG. 5, in the lead tab welding (S30), the first lead tab 31 is welded to an end of the tack welded first multi-tabs 11 to then be adhered. The first lead tab 31 may be made of one conductive material selected from the group consisting of aluminum, copper, a copper alloy and equivalents thereof. In addition, the first lead tab 31 may have a bent corner, providing a substantially 'L' shaped configuration.

Here, the welding may be achieved by ultrasonic welding or resistance welding, but not limited thereto.

The first lead tab 31 can be welded to the third region 11c of the first multi-tabs 11 to then be adhered.

Figure 6:
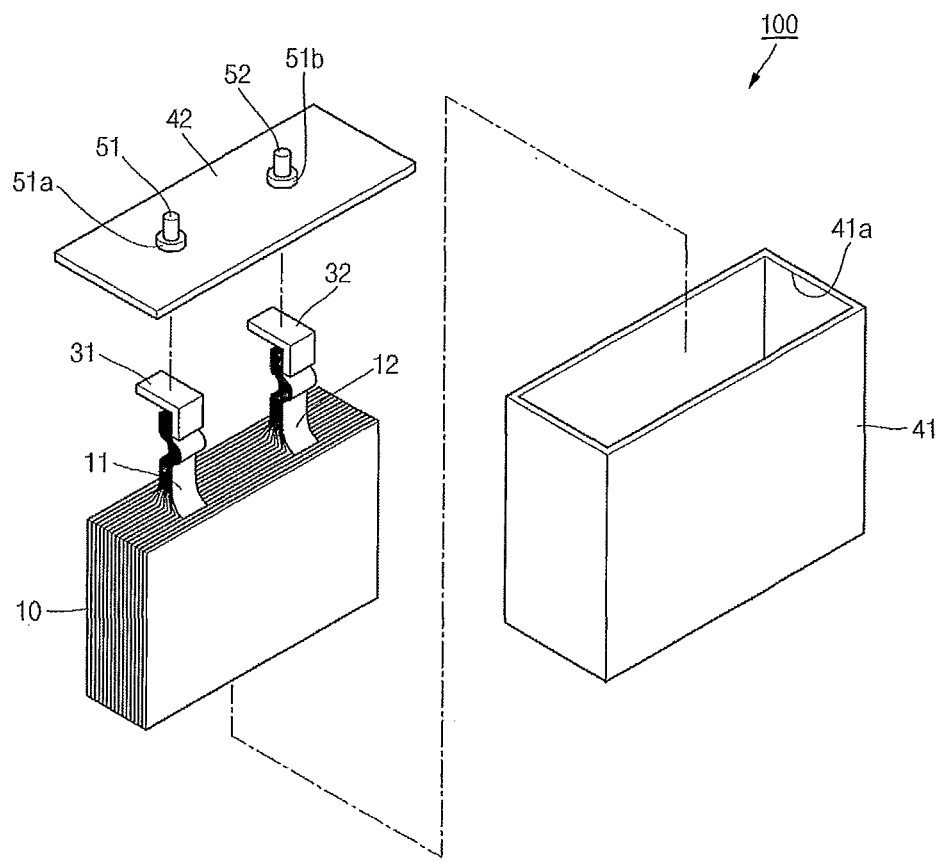

Referring to FIG. 6, in the accommodating in the case (S40), the electrode assembly 10 having the first lead tab 31 and the second lead tab 32 welded thereto is accommodated in the case 41.

The electrode assembly 10 and an electrolytic solution (not shown) are accommodated in the case 41. The electrolytic solution may include an organic solvent and a lithium salt. The organic solvent may include ethylene carbonate (EC), propylene carbonate (PC), diethyl carbonate (DEC), and ethyl methyl carbonate (EMC), and dimethyl carbonate (DMC), and the lithium salt may include $LiPF_6$ or $LiBF_4$. In addition, the electrolytic solution may be in a liquid, solid or gel phase.

The case 41 can be made of aluminum, an aluminum alloy, or a conductive metal such as nickel plated steel, and has a substantially hexahedral shape having a top opening 41a through which the electrode assembly 10 can be inserted and placed. The interior surface of the case 41 is insulated so that the case 41 is electrically insulated from the electrode assembly 10. The case 41 may be made of an insulating material, but the described technology is not limited thereto.

After the electrode assembly 10 and an electrolytic solution are accommodated in the case 41, the top opening 41a of the case 41 is sealed by the cap plate 42, thereby forming the secondary battery 100 according to an embodiment.

The cap plate 42 seals the top opening 41a of the case 41 and may be made of the same material with the case 41. For example, the cap plate 42 may be coupled to the case 41 by laser welding.

Here, the first terminal 51 and the second terminal 52 are formed in the cap plate 42 to be exposed to the outside such as the environment.

The first terminal 51 may pass through the cap plate 42 to extend and protrude upwardly a predetermined length and may be electrically connected to the first lead tab 31 under the cap plate 42.

In addition, the second terminal 52 may pass through the cap plate 42 to extend and protrude upwardly a predetermined length and may be electrically connected to the second lead tab 32 under the cap plate 42.

In order to prevent the cap plate 42 and each of the first terminal 51 and the second terminal 52 from electrically contacting each other, insulating gaskets 51a and 52a may be provided. The gaskets 51a and 52a are further extended downwardly to prevent the cap plate 42 and the electrode assembly 10 from unnecessarily contacting each other. In addition, a separate insulating plate (not shown) may be disposed between the cap plate 42 and the electrode assembly 10.

Next, a manufacturing method for a secondary battery according to another embodiment will be described with reference to FIG. 7.

Figure 7:
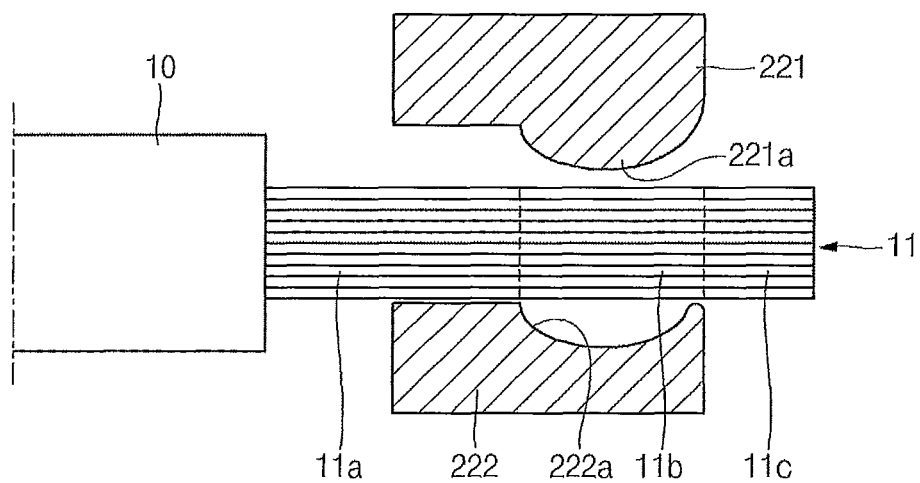
FIG. 7 is a partially cross-sectional view illustrating a multi-tab tack welding step in a manufacturing method for a secondary battery according to another embodiment.

FIG. 7 is a partially cross-sectional view illustrating a multi-tab tack welding step of a manufacturing method for a secondary battery according to another embodiment.

The FIG. 7 embodiment is different from the FIG. 2 embodiment, in view of configurations of a horn 221 and an anvil 222. Thus, the following description will focus on the horn 221 and the anvil 222, and descriptions regarding similar or the same components or procedures will be omitted.

Referring to FIG. 7, in the multi-tab tack welding step (S20) of the manufacturing method for a secondary battery according to another embodiment shown in FIG. 7, lengths of the horn 221 and the anvil 222 are less than those of the horn 21 and the anvil 22 shown in FIG. 2.

That is to say, a protrusion part 221a protruding from the horn 221 toward the anvil 222 is formed at an end of the horn 221 and a recess part 222a of the anvil 222 corresponding to the protrusion part 221a is formed at an end of the anvil 222.

Accordingly, the horn 221 and the anvil 222 form the first region 11a and a second region 11b having a bending part in first multi-tabs 11 and/or second multi-tabs 12. That is to say, tack welding may be performed on the first multi-tabs 11 and/or the first region 11a and the second region 11b of the second multi-tabs 12 while varying configurations of the horn 221 and the anvil 222.

Therefore, since the tack welding is not performed on the third region 11c shown in FIGS. 2 to 4, the first lead tab 31 is directly welded to the third region 11c that is not tack welded in the lead tab welding (S30), thereby improving welding efficiency.

Here, in order to prevent the first multi-tabs 11 and/or the second multi-tabs 12 from being damaged, the horn 221 and the anvil 222 may have round ends.

While the inventive technology has been described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a secondary battery, the method comprising:
   providing an electrode assembly, the electrode assembly including first and second electrode plates, and a separator interposed between the first and second electrode plates, wherein the first electrode plate includes first multi-tabs outwardly extending from an end of the first electrode plate, and wherein the second electrode plate includes second multi-tabs outwardly extending from an end of the second electrode plate;
   tack welding the first and second multi-tabs with the use of upper and lower welding tools, wherein the upper welding tool has a protrusion and the lower welding tool has a recess corresponding in size to the protrusion, wherein, after the tack welding, a single bending portion is formed in each of the first and second multi-tabs, wherein each of the first and second multi-tabs has non-bending portions formed on opposing ends of the single bending portion, and wherein the single bending portion downwardly extends from a bottom surface of the non-bending portions;
   welding first and second lead tabs to the tack welded first and second multi-tabs, respectively; and
   accommodating the electrode assembly having the first and second lead tabs welded thereto in a case, the single bending portion not directly contacting the first and second lead tabs, the single bending portion configured to dampen external impacts or vibrations coming from outside of the case.

2. The method of claim 1, wherein each of the protrusion and the recess is substantially arch-shaped.

3. The method of claim 1, wherein each of the first and second multi-tabs includes:
   a first region extending lengthwise from the electrode assembly;
   a second region extending lengthwise from the first region and having the single bending portion; and
   a third region extending lengthwise from the second region,
   wherein the case has an opening configured to receive the electrode assembly, wherein the opening of the case is sealed by a cap plate, wherein each of the first and second lead tabs includes a first side connected to the third region and a second side crossing the first side and substantially parallel to the cap plate, and wherein the second side of each of the first and second lead tabs is electrically connected to an electrode terminal formed in the cap plate.

4. The method of claim 3, wherein at least the first and second regions of the first and second multi-tabs are tack welded substantially simultaneously.

5. The method of claim 3, wherein the first and second lead tabs are welded to the third region.

6. The method of claim 3, wherein after the tack welding, the first region has a thickness substantially the same as that of the third region.

7. The method of claim 3, wherein each of the first and second multi-tabs further includes a fourth region formed between the first region and the first and second electrode plates, and wherein after the tack welding, the fourth region has a thickness greater than that of the first and third regions.

8. The method of claim 1, further comprising sealing a top opening of the case with a cap plate subsequent to the accommodating.

9. The method of claim 1, wherein the tack welding comprises:
   aligning the first and second multi-tabs; and
   placing the first and second multi-tabs between the upper and lower welding tools; and
   pressing the upper welding tool toward the lower welding tool such that at least part of the protrusion and the first and second multi-tabs are inserted into the recess.

10. The method of claim 1, wherein the tack welding is performed by ultrasonic welding.

11. The method of claim 3, wherein the first side of each of the first and second lead tabs is longer than the third region of each of the first and second multi-tabs such that a gap is formed between the third region of each of the first and second multi-tabs and the second side of each of the first and second lead tabs.

12. A method of manufacturing a secondary battery, the method comprising:
providing an electrode assembly, the electrode assembly including first and second electrode plates, and a separator interposed between the first and second electrode plates, wherein the first electrode plate includes first multi-tabs outwardly extending from an end of the first electrode plate, and wherein the second electrode plate includes second multi-tabs outwardly extending from an end of the second electrode plate;
tack welding the first and second multi-tabs so as to form a single bending portion in each of the first and second multi-tabs, wherein each of the first and second multi-tabs has non-bending portions formed on opposing ends of the single bending portion, and wherein the single bending portion downwardly extends from a bottom surface of the non-bending portions;
welding first and second lead tabs to the tack welded first and second multi-tabs, respectively; and
accommodating the electrode assembly in a case, the single bending portion not directly contacting the first and second lead tabs, the single bending portion configured to dampen external impacts or vibrations coming from outside of the case.

13. The method of claim 12, wherein the tack welding comprises:
aligning the first and second multi-tabs; and
placing the first and second multi-tabs between upper and lower welding tools, wherein the upper welding tool has a protrusion and the lower welding tool has a recess; and
pressing the upper welding tool toward the lower welding tool such that at least part of the protrusion and the first and second multi-tabs are inserted into the recess.

14. The method of claim 12, wherein each of the protrusion and the recess is substantially arch-shaped.

15. The method of claim 12, wherein the tack welding is performed by ultrasonic welding.

* * * * *